US007493562B2

(12) United States Patent
Kui et al.

(10) Patent No.: US 7,493,562 B2
(45) Date of Patent: Feb. 17, 2009

(54) SYSTEM AND METHOD FOR BRIDGE PORT ADMINISTRATION

(75) Inventors: Ping H. Kui, Jackson Heights, NY (US); Joseph M. McAndrews, McKees Rocks, PA (US); Fang Yang, S. Setauket, NY (US)

(73) Assignee: Computer Associates Think, Inc., Islandia, NY (US)

( * ) Notice: Subject to any disclaimer, the term of this patent is extended or adjusted under 35 U.S.C. 154(b) by 79 days.

(21) Appl. No.: 10/759,443

(22) Filed: Jan. 15, 2004

(65) Prior Publication Data

US 2004/0264484 A1 Dec. 30, 2004

Related U.S. Application Data

(60) Provisional application No. 60/483,696, filed on Jun. 27, 2003.

(51) Int. Cl.
G06F 3/00 (2006.01)
(52) U.S. Cl. .................. 715/736; 709/220; 709/230
(58) Field of Classification Search .................. 715/736, 715/734, 738
See application file for complete search history.

(56) References Cited

U.S. PATENT DOCUMENTS

| | | | |
|---|---|---|---|
| 5,696,486 A | 12/1997 | Poliquin et al. | |
| 5,819,028 A | 10/1998 | Manghirmalani et al. | |
| 5,974,237 A | 10/1999 | Shurmer et al. | |
| 5,974,457 A | 10/1999 | Waclawsky et al. | |
| 5,999,179 A * | 12/1999 | Kekic et al. | 715/734 |
| 6,243,756 B1 | 6/2001 | Whitmire et al. | |
| 6,327,677 B1 | 12/2001 | Garg et al. | |
| 6,370,572 B1 | 4/2002 | Lindskog et al. | |
| 6,510,454 B1 | 1/2003 | Walukiewicz | |
| 6,529,502 B2 | 3/2003 | Sarkissian et al. | 370/353 |
| 6,771,288 B2 * | 8/2004 | Boulter | 715/736 |
| 6,968,363 B1 * | 11/2005 | Mulvey | 709/217 |
| 2002/0075297 A1 | 6/2002 | Boulter | 345/736 |
| 2003/0065814 A1 * | 4/2003 | Ishii | 709/239 |
| 2003/0079182 A1 * | 4/2003 | Hofmann | 715/513 |
| 2004/0128380 A1 * | 7/2004 | Chen et al. | 709/224 |

* cited by examiner

*Primary Examiner*—Stephen S Hong
*Assistant Examiner*—Ryan F Pitaro
(74) *Attorney, Agent, or Firm*—Pillsbury Winthrop Shaw Pittman LLP (57) ABSTRACT

A method and system for administering bridge ports for a network are provided. In one embodiment, a method for administering bridge ports for a network includes retrieving information associated with a plurality of switches, the information including at least identifiers of bridging ports of the switches and propagation statuses of the bridging ports. The information for the plurality of switches is displayed through an interactive display. The interactive display is operable to receive updates through the interactive display to at least one of the propagation statuses of at least one of the bridging ports of at least one of the switches. The at least one propagation status is changed based on the updates.

35 Claims, 4 Drawing Sheets

SYSTEM AND METHOD FOR BRIDGE PORT ADMINISTRATION

RELATED APPLICATION

This application claims the priority under 35 U.S.C. § 119 of provisional application Ser. No. 60/483,696 filed Jun. 27, 2003.

TECHNICAL FIELD

This disclosure relates generally to the field of managed networks, and more particularly to a system and method for bridge port administration.

BACKGROUND

Communication networks rapidly convey large amounts of information typically in the form of frames or packets to remote points. Such networks may include a number of apparatuses such as switches, bridges, routers, computers, printers, servers, databases, or other such devices. Network management systems are used to facilitate the management of communication systems. Previous network management systems have allowed a user to propagate a port status and modify the propagation status of ports by managing one switch at a time.

SUMMARY

A method and system for administering bridge ports for a network are provided. In one embodiment, a method for administering bridge ports for a network includes retrieving information associated with a plurality of switches, the information including at least identifiers of bridging ports of the switches and propagation statuses of the bridging ports. The information for the plurality of switches is displayed through an interactive display. The interactive display is operable to receive updates through the interactive display to at least one of the propagation statuses of at least one of the bridging ports of at least one of the switches. The at least one propagation status is changed based on the updates.

DETAILED DESCRIPTION OF EXAMPLE EMBODIMENTS

Figure 1:
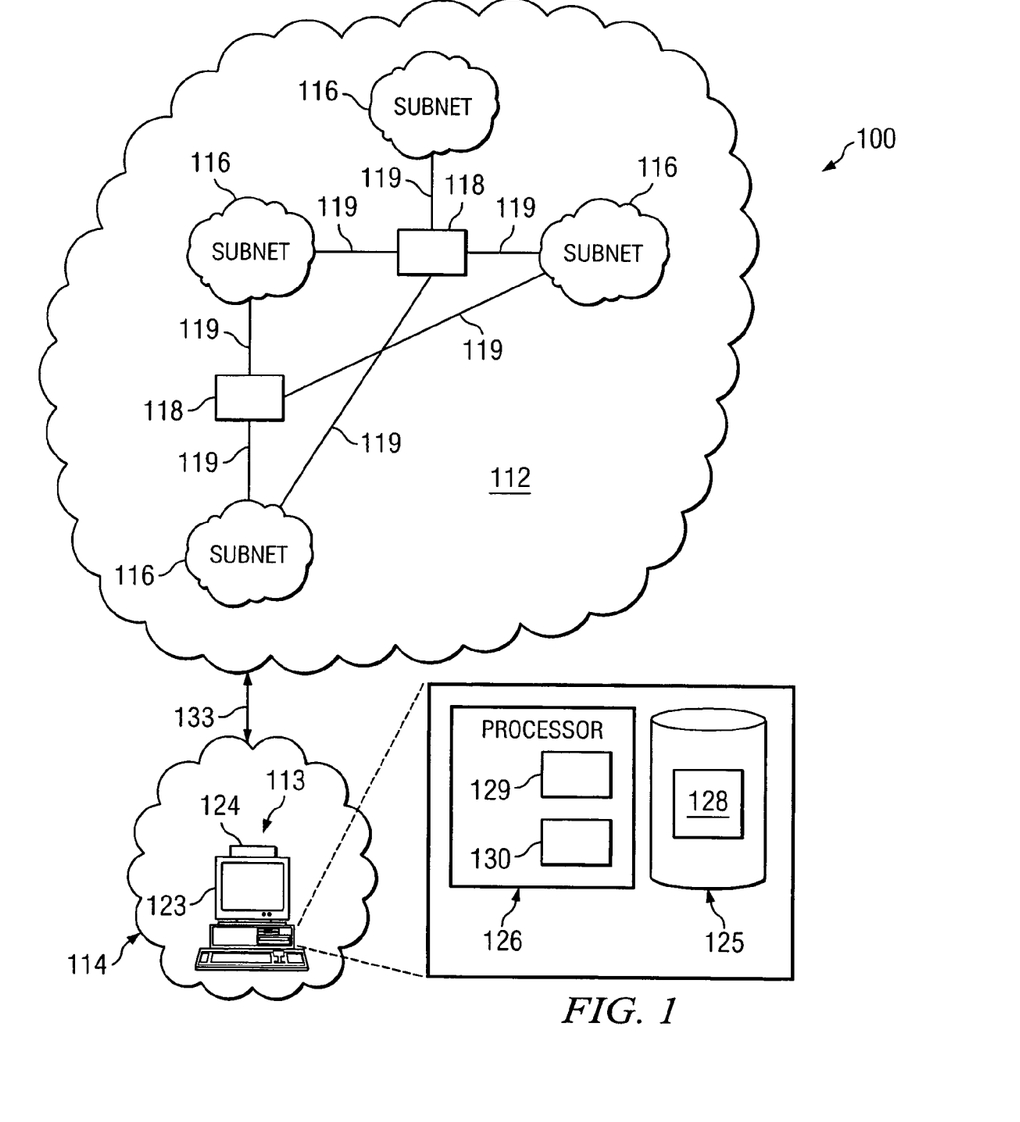
FIG. 1 is a block diagram illustrates an exemplary communication system including a network management system.

FIG. 1 illustrates one embodiment of a communication system 100 that uses a graphical user interface to manage multiple ports in a communication network. At a high level, communication system 100 includes a network 112 and a management system 114 coupled via a link 133. Link 133 may comprise a plurality of discrete wireless and/or wireline links.

Network 112 communicates information between source and destination point. The sources and/or destination may be in network 112 or external to the network. Within the network, information may be communicated on wireless and/or wireline links between network devices. Network 112 may include one or more subnetworks, local area networks (LANs), radio access networks (RANs), metropolitan area networks (MANs), wide area networks (WANs), all or a portion of the global network known as the internet, and/or any other communication system or systems at one or more locations. Network 112 may communicate, for example, internet protocol (IP) packets, frame relaying frames, a synchronous transfer mode (ATM) cells, voice, video, data, and other suitable information between network addresses. It will be understood that network 112 may comprise TCP/IP, IPX, SNA, DEL net, or other suitable networks.

In the illustrated embodiment, network 112 includes a plurality of subnetworks ("subnet") 116 coupled to each other and/or network devices by a plurality of network elements 118. Network devices such as computers, printers, servers, data storage devices, or other devices may be coupled to network elements 118. Network elements 118 may include switches, routers, hubs, or other elements operable to selectively pass traffic in network 112 to subnets 116 or network devices. Network elements 118 may be a plurality of switches, which will be referred to as switches 118. In one embodiment, switches 118 comprise managed switches 118. As used herein, managed switches 118 means switches 118 that can be managed by management system 114. Subnets 116 comprise segments of network 112 coupled via bridge ports 119 of switches 118. Subnets 116 may be formed from all or part of one or more LANs, RANs, MANs and WANs and may include routers, bridges, switches, repeaters, computers, data storage devices, servers, and other devices operable to communicate in a communication network. Switches 118 are operable to pass traffic between subnets 116 over bridge ports 119. Bridge ports 119 may be any suitable link capable of passing traffic between subnets 116. In one embodiment, bridge ports 119 include a wireline link capable of passing traffic between subnets 116, wherein subnets 116 include a plurality of LAN segments. Each subnet 116 may comprise the same or different topologies as other subnets 116, such as bus, ring, tree, star, or other suitable topologies operable to pass information between end stations.

Management system 114 manages network 112. Management system 114 may query, receive data from, store configuration information and other data for and send administrative commands to network 112. While management system 114 is illustrated as disparate from network 112, network 112 may include management system 114.

Management system 114 may comprise one or more management computers to manage network elements 118 in network 112. In the illustrated embodiment, management system 114 includes management computer 113.

Management computer 113 includes graphical user interface (GUI) 123, network interface 124, a database 125, and a processor 126. FIG. 1 only provides one example of a computer that may be used with the disclosure. The present disclosure contemplates computers other than general purpose computers as well as computers without conventional operating systems. As used in this document, the term computer is intended to encompass a personal computer, a workstation, network computer, mainframe, or any other suitable processing device. Management computer 113 may be adapted to execute any operating system including UNIX, Windows or any other suitable operating system.

GUI 123 comprises a graphical user interface operable to allow the user of management computer 113 to manage network 112. Generally, GUI 123 provides the user of management computer 113 with an efficient user-friendly presentation of data provided by management computer 113 or network 112. GUI 123 may comprise a plurality of displays having interactive fields, pull-down lists, and buttons operated by the user. In one example, GUI 123 presents an explorer-type interface and receives commands from the user. It should be understood that the term graphical user interface may be used in the singular or the plural to describe one or more graphical user interfaces in each of the displays of a particular graphical user interface. Furthermore, GUI 123 contemplates any graphical user interface that processes information in computer 113 and efficiently presents the information to the user.

Network interface 124 may facilitate communication with network 112, including switches 118 in network 112. In certain embodiments, computer 113 may generate a request to at least one of the switches 118 in network 112 for information associated with the at least one of the switches 118. Interface 124 calibrates the transmission of these requests and the reception of responses to these requests. Generally, interface 124 comprising the logic encoded in software and/or hardware in a suitable combination and operable to communicate with network 112 via the link 133. More specifically, interface 124 may comprise software supporting one or more communications protocols associated with link 133 and network 112 hardware operable to communicate physical signals.

Database 125 comprises any storage media for the storage and retrieval of information. According to one embodiment, database 125 may comprise a relational database normally accessed through structured query language (SQL) statements. Relational databases use sets of schemas to describe the tables, columns, and relationships in the tables using basic principles known in the field of database design. Alternatively, database 125 may comprise XML documents, flat files, or, comma-separated-value (CSV) files. In the illustrated embodiment, database 125 is a relational database including a port table 128.

Port table 128 comprises a list of ports discovered in network 112, which is stored in database 125. Port table 128 may be created by computer 114, a third party, or any other suitable user of any computer in system 100 or loaded from a default table. Table 128 may be any suitable format including XML documents, flat files, CSV files, SQL tables, relational database tables, or others.

Processor 126 executes instructions and manipulates data to perform operations of management computer 113. Although FIG. 1 illustrates a single processor 126 in computer 113, multiple processors 126 may be used according to particular needs, and reference to processor 126 is meant to include multiple processors 126, where applicable. In the illustrated embodiment, processor 126 includes switch administration console 129 and switch management engine 130. Switch management engine 130 identifies switches 118 (and other network elements) and interconnections between switches 118 and between subnets 116 in network 112, communicates request to switches 118, monitors switches 118, and stores this information in database 125. As used herein, communicate means initiate communication, send messages or commands, or transmit or receive any other suitable traffic over network 112. Switch management engine 130 may include any hardware, software, firmware, or combination thereof operable to retrieve information associated with network elements. It will be understood that while switch management engine 130 is illustrated as a single multi-task module, the features and functionality performed by this engine may be performed by multiple modules.

In the illustrated embodiment, switch management engine 130 discovers the topology of network 112 to identify layer 2 devices such as layer 2 switches, their ports and virtual local area networks (VLAN). For example, switch management engine 130 identifies bridging switches 118 and subnets 116 in network 112. Switch management engine 130 may query each address in network 112 using simple network management protocol (SNMP) requests to identify switches 118 in network 112. Additionally, switch management engine 130 identifies the ports on each switch 118 and the network devices connected to each port. Switch management engine 130 may use SNMP to request management information base (MIB) objects from network elements 118 in network 112. A MIB may be a database of management information maintained by a device or agent. For example, a MIB employed by most network devices is known in the industry as MIB-2. Within a MIB, object identifiers (OIDs) may be used to classify and/or identify information. For example, an OID may be a sequence of numbers that reference a particular item or table within a MIB. Accordingly, a MIB object is a particular object within a MIB that is referenced by an OID. One such object is SysObjID that is a sequence of numbers that uniquely identifies a device. Using SNMP, one may, in one embodiment, retrieve the SysObjID for a device by querying OID 1.3.6.1.2.1.1.2, which represents the second item within the standard MIB-2 system group table. SNMP requests are encoded into protocol data units (PDUs) and sent to the SNMP agent layer over a TCP/IP. Switch management engine 130 receives, decodes, and filters SNMP get-responses from the agent layer and stores this information in database 125. In one embodiment, switch management engine 130 identifies the network devices connected to each port of a switch 118 using a media access control (MAC) address and the information stored in database 125. For those network devices that have SNMP turned off or do not support SNMP, requests are sent to a local router to read the router's address resolution protocol (ARP) cache to help identify these devices.

Switch management engine 130 may also determine the connection between network elements 118 and subnets and the paths between network devices in network 112. The path discovery process may employ spanning tree protocol MIB tables on the switch or any other suitable process for determine the path connections between network elements 118. STP enables switches 118 to use a spanning tree algorithm to determine the limits of network traffic circuits, which stores this information in STP MIB tables. Switch management engine 130 may query STP MIB tables, when available, to determine path connections. Alternatively, the path connection may be manually configured by user of computer 113.

Switch administration console 129 may process information associated with switches 118 and bridge ports 119 and make request to switch management engine 130. For example, switch administration console 129 may request identifiers of bridge ports via switch management engine 130. As used herein, identifier includes any information that switch administration console 129 may associate with corresponding network element 118. Switch administration console 129 may include any hardware, software, firmware, or combination thereof operable to display information associated with the network elements. It will be understood that switch administration console 129 is illustrated as a single multi-task module, the features and functionality performed by this engine may be performed by multiple modules. In one embodiment, GUI 123 displays the switch administration console 129 as an interactive display operable to receive user inputs such as changing the propagation status of ports, displaying a switch view, displaying a chassis monitor view of a switch, or other suitable input associated with the switches 118, bridge ports 119, and network 112. Changing the propagation status includes storing an indication that a selected bridge port 119 should or should not be polled for its current status. In another embodiment, GUI 123 may be updated with changes to the propagation status. As used herein, updating the GUI 123 means changing the display of GUI 123 based on the changes made by a user of computer 113.

In one aspect of operation, switch management engine 130 may identify network devices and store Thai information in database 125. Based on this information stored in database 125, switch management engine 130 query those identified devices and determine which network devices are bridging switches 118. Additionally, information may be retrieved by switch management engine 130 regarding bridge ports 119, network devices connected to these bridge ports 119 (including links to other bridge ports 119), and virtual local area network (VLAN) configuration information and stored this information in database 125. Switch administration console 129 formats the information stored in database 125 and displays the formatted information in GUI 123.

Figure 2:
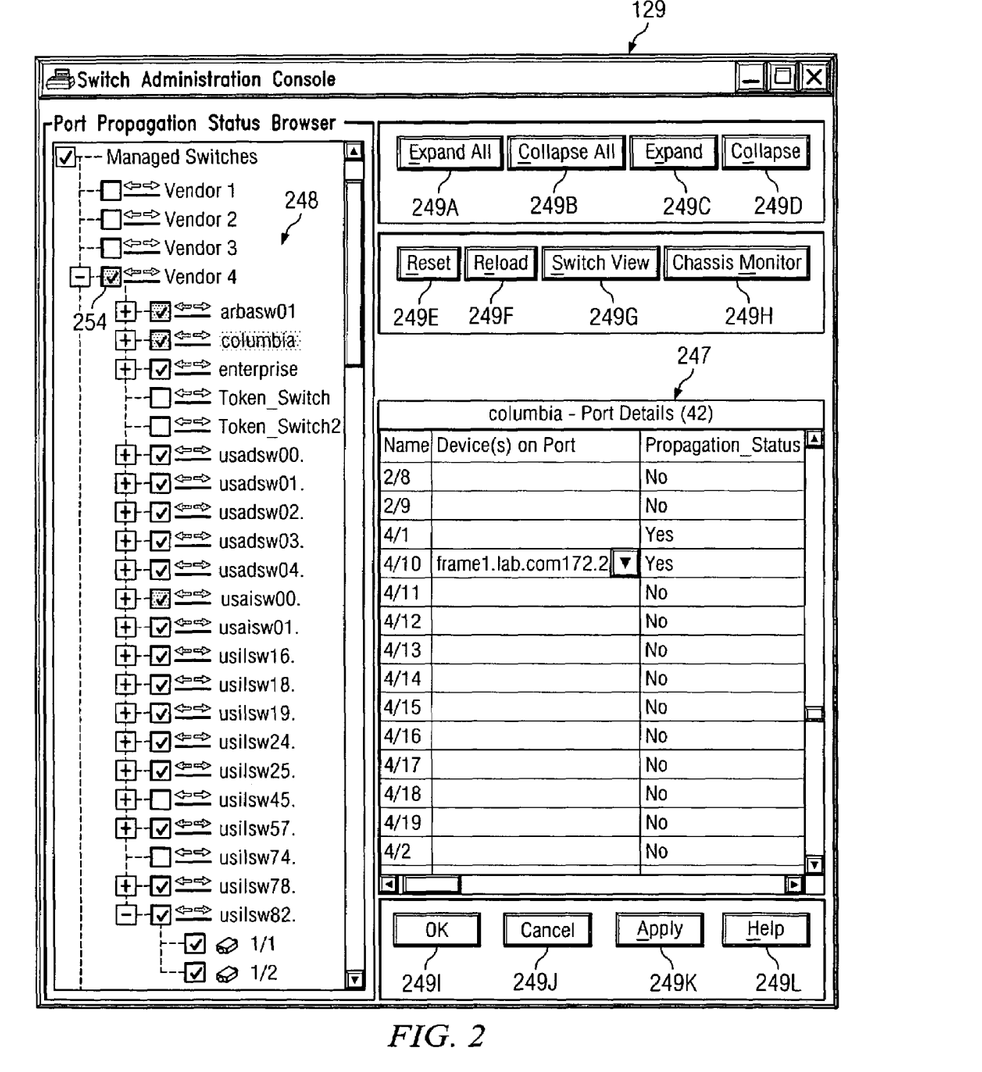
FIG. 2 illustrates an exemplary diagram illustrating an example of a switch administration console referred to in FIG. 1.

FIG. 2 illustrates one embodiment of switch administration console 129 for managing switches 118 and ports 119 in network 112. Generally, switch administration console 129 provides the user with a view of information associated with switches 118 in network 112. More specifically, switch administration console 129 provides a central view and control of all, substantially all, or at least a number of the bridge ports 119 on switches 118 in an enterprise network with information stored in database 125. In one embodiment, the user of management computer 113 can view all switches 118 and the status of associated ports 119 and change the propagation status of a single port 119, multiple ports 119 under one switch 118, multiple ports 119 across different switches 118, or any combination of ports and switches. In certain situations, this may ease the work required by the user of management computer 113 when changing the propagation statuses of ports 119 in network 112, such as in the case where statuses of a large number of ports 119 are changed.

Switch administration console 129 includes a plurality of display elements such as a port detail table 247, a switch tree 248, and interactive buttons 249. Port detail table 247 and switch tree 248 may each be displayed in their own window within a single window. These display elements provide a central view of all switches and associated port statuses and may allow a user of computer 113 to change the propagation status of a single port 119, multiple ports 119 under one switch 118, multiple ports 119 across different switches 118, or any combination thereof. For example, switch tree 248 may comprise a hierarchical tree, illustrating a logical organization of data retrieved from network 112 and including standard tree processing, such as expanding and collapsing. In the illustrated embodiment, switch tree 248 has a root node "Managed Switches" with the next node level indicating a switch class such as vendor (e.g., 3COM, Cisco, etc). In one embodiment, the propagation statuses of each port 119 associate with a switch 118 are indicated in check box 254. For example, if all ports 119 of a switch 118 are propagating, check box 254 is checked. Furthermore, if no port 119 of the switch 118 is propagating, check box 254 is unchecked. If some but not all ports 119 of the switch 118 are propagating, check box 254 is checked in gray. In this embodiment, the propagation statuses of all ports 119 of a switch 118 displayed in switch tree 248 may be changed by clicking check box 254 to check or uncheck it.

Port detail table 247 may comprise a tabular display, including a spreadsheet with several columns and rows, with each intersection comprising a cell. Each cell is populated with information from database 125 and associated with ports 119 of a switch 118 in network 112. Each, as used herein, means every one of at least a subset of the identified items. In one embodiment, port detail table 247 includes three columns; name, device(s) on port, and propagation status. Each row illustrates the above information for each port of a selected switch 118 with information retrieved from database 125. In one embodiment, a switch 118 represented in switch tree 248 is selected, for example, by using a mouse and clicking on the name of a switch in switch tree 248. The information associated with the ports of the selected switch in switch tree 248 is retrieved from port table 128 and used to populate port detail table 247. In one embodiment, port detail table 247 includes port's name, devices on port, propagation status, status, type, speed, description, or any other suitable information operable to describe the port or devices connected to the port. In one embodiment, the devices on port column is a drop-down list such that the first device connected to the port is displayed and by simply clicking on the cell a list is displayed of all devices on the port.

The propagation status may be directly accessed by the user to initiate changes in the status. For example, the user may turn on (Yes) or turn off (No) the propagation status. In one embodiment, the user of computer 113 may change the propagation status for all ports 119 of managed switches 118 by checking the check box 254 at the root node "Managed Switches." In another embodiment, the user of computer 113 may change the propagation status for all ports 119 of a switch class by checking the check box 254 of "Vendor 1." After checking or unchecking a check box 254, a user may either click the Apply button 249K or the OK button 249I to save the changes in database 125. If a user of computer 113 selects the Apply button 294K, the changes may be saved to database 125, and switch management engine 130 may be notified to apply the changes made. In this case, switch administration console 129 may refresh GUI 123 and remain open for continued use. If a user of computer 113 selects the OK button 249I, the changes may be saved to database 125, and switch management engine 130 may be notified to apply the changes made. In this case, switch administration console 129 may be closed.

Interactive buttons 249 allow the user of management computer 113 to change the display of port information on switch administration console 129. In one embodiment, interactive display buttons 249 include an expand all button 249a, a collapse all button 249b, an expand button 249c, a collapse button 249d, a reset 249e, a reload button 249f, a switch view button 249g, a chassis monitor button 249h, an OK button 249i, a cancel button 249j, an apply button 249k, and a help button 249l. When a user actuates OK button 249i, changes the user made to the propagation status of a port 119 displayed in port detail table 247 will be saved in database 125 and a command signal will be issued to update management status for those affected switches. Cancel button 249j exits administration console 129 and discards any changes made by the user of management computer 113. Help button 249I provides the user of management computer 113 with information requested by the user for aide in operating administration console 129. In one embodiment, a separate window is displayed conveying requested information. Reset button 249e removes all changes to the propagation status made by the user since the program started or the last user applied the changes by loading cache 127 with backup memory 128, and switch tree 248 is then rebuilt. In one embodiment, switch administration console 129 navigates to the previous selected switch 118.

Switch view button 249g launches a window associated with a selected switch 118 that provides a more detailed view of that switch 118. The switch view may provide a display of the following field for each port: VLAN trunk, main, type, speed, description, device on port, VLAN, status, propagation status, STP, transmit, receive, and I/O errors. In one embodiment, the information associated with a selected switch 118 that is displayed in port detail table 247 is automatically updated when changes are made to the selected switch 118 via the switch view. In one embodiment, the dialog box provided by switch view button 249g provides a graphical display of the current status for each port of the selected switch 118, which may be color coded. In another embodiment, the dialog box provides a table of devices on each port of the switch, which have been discovered and have information saved in database 125. In yet another embodiment, a detailed description and statistical information for each port or device is provided. In one embodiment, switch view button 249g provides a dialog box that enables a user of computer 113 to specify which ports they would like to propagate status and, for supported switches 118, enable users to configure port assignments on VLANs. In another embodiment, a user of computer 113 may propagate status on a port by right-clicking on that port in the switch view dialog and select "propagate status" from the pop-up menu. This embodiment provides an alternative method for changing the propagation status of a port of a selected switch 118, as compared to changing the propagation status via switch administration console 129.

Figure 3:
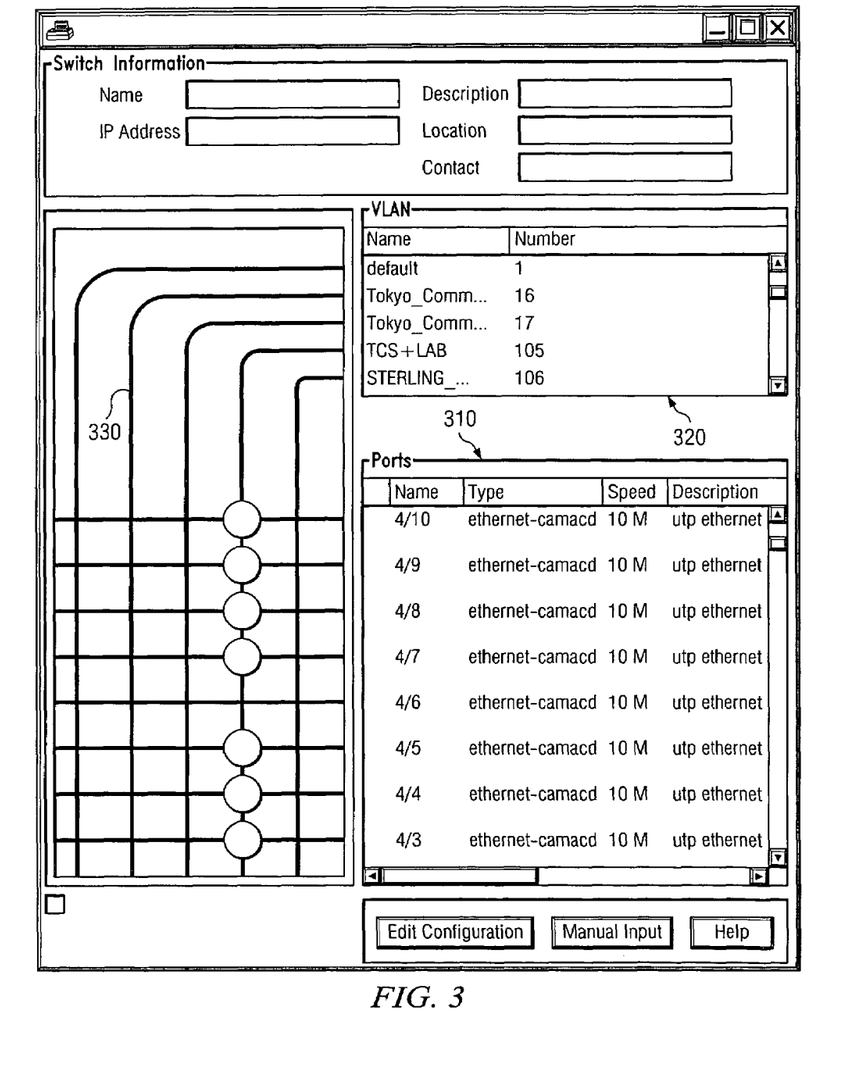
FIG. 3 illustrates an exemplary diagram illustrating an example of a VLAN switch view dialog box.

VLAN information is frequently stored in proprietary MIBs on the various switches, so Switch View may provide two views: a switch view without VLAN information and a switch view with VLAN retrieved information. In one embodiment, VLAN of a port may be reassigned using VLAN pipe segments in the VLAN switch view dialog box illustrated in FIG. 3. In this embodiment, pipe segment extending from a port table 310 intersect pipe segments extending from a VLAN table 320 and displayed in VLAN assignment field 330. A dot operable to be set on the pipe segment associate with each port indicates the VLAN assignment of that port. In operation, the dot at one intersection of the segments may indicate that port is assigned to a first VLAN. By click to set the dot on the pipe segment associated with the port to an intersection with a VLAN pipe segment associated with a second VLAN, the user of computer 113 has reassigned the port from the first VLAN to the second VLAN. Alternatively, a user may change from a first VLAN to a second VLAN simply by selecting/clicking on the intersection of a VLAN pipe and a port pipe. In another embodiment, every time switch view button 249g is initialized, requests are sent from computer 113 to the forwarding tables of the switches 118, which is used to update existing information stored in database 125.

Chassis monitor button 249h launches a window associated with a selected switch which may include chassis information, memory pool information, and CPU and processing information. Chassis information may include one or more of the following: chassis type, chassis back playing type, chassis model, chassis minor, major alarm status, chassis temperature status, chassis fan status, chassis power supply type and status, chassis slot information and configuration. The memory pool information may include one or more of the following: memory type, used memory, free memory, and largest continuous free memory. CPU and processing information may include one or more of the following: CPU type, CPU usage information, processing information such as the CPU it is running on, process ID, process name, process CPU time, process running time, priority, allocated memory, freed memory, invoke times, process CPU usage. In one embodiment, the chassis MIB is regularly monitored through polling. In another embodiment, the chassis dialog box displays a process table illustrating tasks the CPU is currently processing. In this embodiment, a user of computer 113 may click on a row associate with a process to display a CPU graph for that process in the dialog box illustrating CPU usage as a function of time. In yet another embodiment, the user may change the polling interval through the dialog box.

Expand all button 249a is operable to expand each node of the switch tree 248 to the leaf level. Collapse all button 249b collapses switch tree 248 to the root node level. Expand button 249c expands the selected node to the next level. Collapse button 249d collapses all the nodes below the selected node. When the root node is selected, switch view and chassis monitor buttons 249g and 249h respectively are disabled and port detail table 247 is disabled. When switch class node is selected, switch view and chassis monitor buttons are disabled and port detail table is disabled. When switch node is selected, port detail table 247 will display information for all ports 119 on switch 118. When a port node is selected, port detail table 247 will display detail for that single port 119 and switch view and chassis monitor button are disabled.

Figure 4:
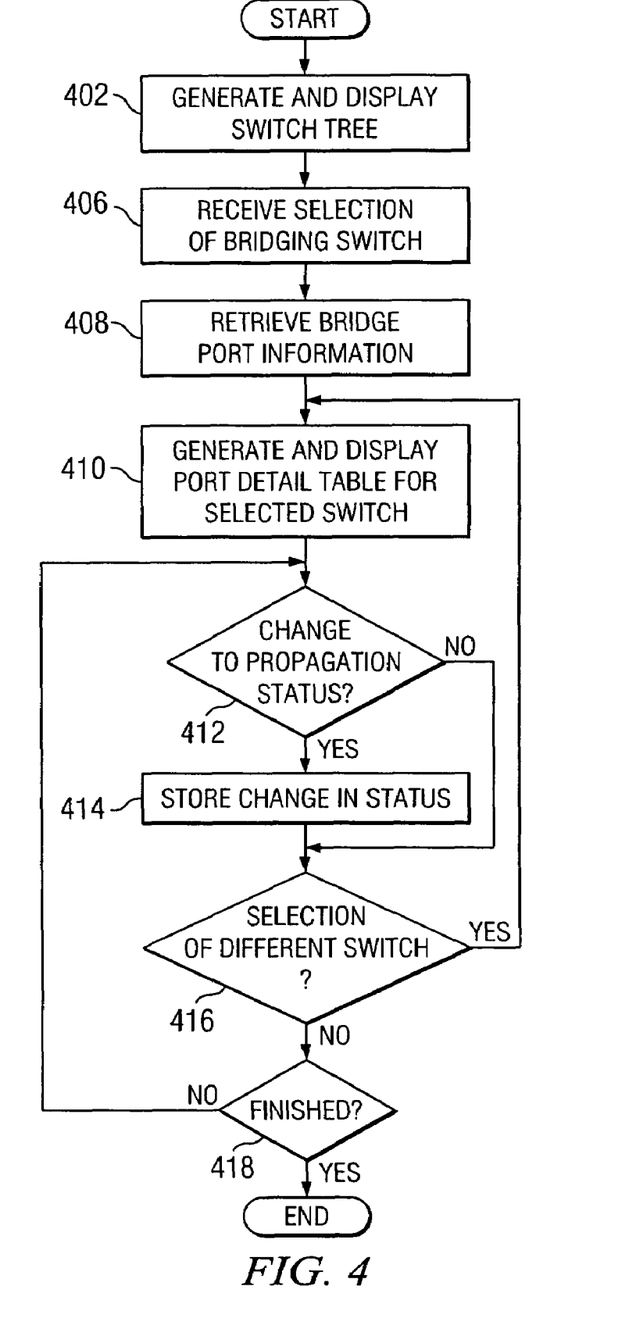
FIG. 4 is an exemplary flow diagram illustrating an example method for bridge port administration.

FIG. 4 illustrates a flow chart of an exemplary method 400 for bridge port administration. Method 400 is described in respect to system 100. However, any other suitable system may use method 400 to create and provide administration console 129 without departing from the scope of this disclosure. Generally, method 400 describes switch administration console 129 retrieving information associated with the network elements 118, displaying the associated information, receiving administrative commands, and transmitting request to network elements 118 via switch management engine 130.

The method begins at step 402 where switch administration console 129 generates and displays switch tree 248 via GUI 123. Next, at step 406, switch administration console 129 receives a selection of a bridging switch 118. As discussed above, the selecting may be made by providing an IP address, a host name, selecting a tree item in switch tree 248, or any other suitable manner that allows switch administration console 129 to communicated with the database 125. Next, at step 408, switch administration console 129 retrieves bridge port information from the port table 128. In one embodiment, switch administration console 129 invokes switch management engine 130 to transmit SNMP get requests to the selected switch 118. The statuses of ports associated with the selected switch 118 may be indicated in switch tree 248. In one embodiment, the statuses of the ports are indicated in a color-coded icon, such as checkbox 254, associated with the switch 118 and displayed in switch tree 248. Next, at step 410, switch administration console 129 generates and displays port detail table 247 associated with the switch selected in switch tree 248. At this step, the user may via GUI 123 make changes to the propagation status of a port or a group of ports from a switch 118 or ports of a plurality of switches 118. At decisional step 412, if switch administration console 129 receives a change to the propagation status of a port associated with the selected switch 118, then switch administration console 129 stores a change of the propagation status to the selected switch 118 in port table 128 at step 414. If no change has been received, method 400 proceeds to decisional step 416. If switch administration console 129 receives a different switch 118 selection, then method 400 proceeds to step 410, at which point the port detail table 247 is populated with port information associated with the different switch 118. If a selection for a different switch 118 has not been received, then method 400 proceeds to decisional step 418. At decisional step 418, if a user of switch administration console 129 has indicated via GUI 123 that the administration session is finished, method 400 ends. If a user of switch administration console 129 has not indicated that the administration session is finished, switch administration console 129 returns to step 412

The preceding flow chart and accompanying description illustrate only an exemplary method 400 for bridge port administration via switch administration console 129. However, system 100 contemplates management system 114 using any suitable technique for performing these tasks. Thus, many of the steps in this flowchart may take place simultaneously and/or in different orders than as shown. Moreover, management system 114 may use methods with additional steps, fewer steps, and/or different steps, so long as the methods remain appropriate.

Although the present disclosure has been described in detail, it should be understood that various changes, substitutions and alterations can be made hereto without departing from the sphere and scope of the disclosure as defined by the appended claims.

What is claimed is:

1. A method for administering bridge ports for a network, comprising:
   retrieving information associated with a plurality of switches, the information including at least identifiers of bridging ports of the switches and statuses of the bridging ports;
   displaying the information for the plurality of switches through an interactive display;
   receiving through the interactive display updates to at least one propagation status of at least one of the bridging ports of at least one of the switches, wherein propagation status includes an indication of whether or not a bridge port should be polled to obtain its current status;
   changing the at least one propagation status based on the updates; and
   displaying the changed at least one propagation status through the interactive display.

2. The method of claim 1, wherein displaying the information through an interactive display comprises displaying all the retrieved identifiers of the bridging ports on a single window.

3. The method of claim 2, wherein displaying all the retrieved identifiers of the bridging ports on a single window comprises displaying all the retrieved identifiers in a hierarchical tree structure.

4. The method of claim 1, the information associated with the switches further comprising a switch type.

5. The method of claim 1, wherein displaying the information comprises color-coding status of the bridging ports.

6. The method of claim 1, the interactive display comprising a first and a second window, the first window comprising a hierarchical tree structure of all managed switches, the second window comprising a tabular display of port information of a managed switch selected in the hierarchical tree structure.

7. The method of claim 6, wherein the second window provides a field in which a user of the interactive display can view the propagation status of a plurality of ports of the managed switch selected in the hierarchical tree structure.

8. The method of claim 7, wherein the propagation status of any or all ports of the managed switch is selected in the hierarchical tree structure.

9. The method of claim 1, the interactive display operable to allow a user to change the propagation status of one or more of all ports of a single switch, a plurality of ports of a single switch, and a plurality of ports of multiple switches.

10. The method of claim 9, wherein the interactive display operable to allow a user to change the propagation comprises the interactive display operable to allow a user to change the propagation status from a single window.

11. The method of claim 1, the interactive display operable to allow a user to change the propagation status of all ports of a single switch, a plurality of ports of a single switch, and all of ports of multiple switches.

12. Software embodied in a medium and operable with a computer for displaying information associated with network elements in an enterprise system, the software operable to:
   retrieve information associated with a plurality of switches, wherein each switch of the plurality of switches includes one or more bridge ports, wherein the information associated with the plurality of switches includes at least identifiers of the bridge ports of each switch and propagation statuses of the bridge ports, and wherein propagation status includes an indication of whether or not a bridge port should be polled to obtain its current status;
   display the information for the plurality of switches through an interactive display;
   receive through the interactive display updates to at least one propagation status of at least one of the bridge ports of at least one of the switches;
   change the at least one propagation status based on the updates; and
   displaying the changed at least one propagation status through the interactive display.

13. The software of claim 12, wherein the software operable to display the information through an interactive display comprises software operable to display all the retrieved identifiers of the bridge ports on a single window.

14. The software of claim 13, wherein the software operable to display all the retrieved identifiers of the bridge ports on a single window comprises the software operable to display all the retrieved identifiers in a hierarchical tree structure.

15. The software of claim 13, the information associated with the switches further comprising a switch type.

16. The software of claim 12, wherein the software operable to display the information comprises software operable to color-code a propagation status of the bridge ports.

17. The software of claim 12, the interactive display comprising a first and a second window, the first window comprising a hierarchical tree structure of all managed switches, the second window comprising a tabular display of bridge port information of a managed switch selected in the hierarchical tree structure.

18. The software of claim 17, wherein the second window provides a field in which a user of the interactive display can view the propagation status of a plurality of bridge ports of the managed switch selected in the hierarchical tree structure.

19. The software of claim 18, the propagation status of any or all bridge ports of the managed switch is selected in the hierarchical tree structure.

20. The software of claim 12, the interactive display operable to allow a user to change the propagation status of one or more of all bridge ports of a single switch, a plurality of bridge ports of a single switch, and a plurality of bridge ports of multiple switches.

21. The software of claim 20, wherein the interactive display operable to allow a user to change the propagation status comprises the interactive display operable to allow a user to change the propagation status from a single window.

22. The software of claim 12, the interactive display operable to allow a user to change the propagation status of all bridge ports of a single switch, a plurality of bridge ports of a single switch, and all of bridge ports of multiple switches.

23. A system for displaying information associated with network elements in an enterprise system, comprising:
    memory operable to store information associated with a plurality of network elements in the enterprise system, the network elements including a plurality switches, wherein each switch of the plurality of switches includes one or more bridge ports, wherein the information associated with the plurality of switches includes at least identifiers of the bridge ports of each switch and propagation statuses of the bridge ports, and wherein propagation status includes an indication of whether or not a bridge port should be polled to obtain its current status; and
    one or more processors collectively operable to:
        retrieve the information associated with at least a subset of the plurality of switches;
        display the retrieved information through an interactive display;
        receive through the interactive display updates to at least one propagation status of at least one of the bridge ports of at least one of the switches;
        change the at least one propagation status based on the updates; and
        displaying the changed at least one propagation status through the interactive display.

24. The system of claim 23, wherein processors operable to display the information through an interactive display comprise processors operable to display all the retrieved identifiers of the bridge ports on a single window.

25. The system of claim 24, wherein the processors operable to display all the retrieved identifiers of the bridge ports on a single window comprise processors operable to display all the retrieved identifiers in a hierarchical tree structure.

26. The system of claim 23, the information associated with the switches further comprising a switch type.

27. The system of claim 23, wherein processors operable to display the information comprise processors operable to color-code a status of the bridge ports.

28. The system of claim 23, the interactive display comprising a first and a second window, the first window comprising a hierarchical tree structure of all managed switches, the second window comprising a tabular display of bridge port information of a managed switch selected in the hierarchical tree structure.

29. The system of claim 28, wherein the second window provides a field in which a user of the interactive display can view the propagation status of a plurality of bridge ports of the managed switch selected in the hierarchical tree structure.

30. The system of claim 29, wherein the propagation status of any or all bridge ports of the managed switch are selected in the hierarchical tree structure.

31. The system of claim 23, the interactive display operable to allow a user to change the propagation status of one or more of all bridge ports of a single switch, a plurality of bridge ports of a single switch, and a plurality of bridge ports of multiple switches.

32. The system of claim 31, wherein the interactive display operable to allow a user to change the propagation status comprises the interactive display operable to allow a user to change the propagation status from a single window.

33. The system of claim 23, the interactive display operable to allow a user to change the propagation status of all bridge ports of a single switch, a plurality of bridge ports of a single switch, and all bridge ports of multiple switches.

34. A method for displaying information associated with switches in an enterprise system, comprising:
    retrieving information associated with a plurality of switches, wherein each switch of the plurality of switches includes one or more bridge ports, wherein the information associated with the plurality of switches includes at least identifiers of the bridge ports of each switch and propagation statuses of the bridge ports, and wherein propagation status includes an indication of whether or not a bridge port should be polled to obtain its current status;
    displaying all the retrieved identifiers in a hierarchical tree structure through an interactive display, the interactive display comprising a first and a second window, the first window comprising a hierarchical tree structure of all managed switches, the second window comprising a tabular display of bridge port information of a managed switch selected in the hierarchical tree structure;
    receiving through the interactive display updates to at least one propagation status of at least one of the bridge ports of at least one of the switches;
    changing the at least one propagation status based on the updates; and
    displaying the changed at least one propagation status through the interactive display.

35. The software of claim 12, wherein the information associated with the plurality of switches further includes at least the hierarchical relationships of the plurality of switches, wherein display of the information for the plurality of switches further includes display of a hierarchical representation of the plurality of switches derived from the hierarchical relationships and wherein a representation of a switch on the hierarchical representation includes an indication of the propagation status of all bridge ports associated with the switch, wherein the indication includes a first indication when all associated bridge ports are propagating, a second indication when no associated bridge ports are propagating, and a third indication when some of the associated bridge ports are propagating.

* * * * *